UNITED STATES PATENT OFFICE 2,358,833

ANTIOXIDANT

Warren M. Smith, Baton Rouge, La., and Carroll J. Wilson, Westfield, N. J., assignors to Standard Oil Development Company, a corporation of Delaware No Drawing. Application September 20, 1941, Serial No. 411,694

8 Claims. (Cl. 44—78)

This invention relates to a novel and efficient antioxidant material adapted for use with various organic materials, particularly petroleum products.

An object of the invention is to provide a class of compounds which, when added to any organic materials normally susceptible to oxidation, such as mineral lubricating oils, gasolines, fatty oils, drying oils, and the like, will inhibit or substantially retard such normal oxidation and deterioration of these materials. In the case of lubricating oils, the incorporation of small proportions of the new antioxidants will substantially retard oxidation and consequent development of corrosive materials in such oils under the severe conditions of service. When added to gasolines, they greatly reduce the formation of gums. Other advantages in the use of the antioxidant materials in various organic substances will be evident from the description of the invention which follows.

The novel antioxidant compositions of the present invention comprise the tertiary alkyl ethers of aromatic aldehydes. The aldehyde group may be attached directly to the aromatic nucleus or it may be connected to the nucleus through a primary or secondary alkyl group preferably containing not more than four carbon atoms, but in certain instances this group may contain as many as 30 carbon atoms.

The antioxidant compounds of this invention may be more accurately described as the aromatic aldehydes having the formula $$ROArC_nH_{2n}CHO \qquad (1)$$

where Ar is an aromatic nucleus, which may contain one or more benzene rings or a condensed ring system, such as naphthalene and the like, R is a tertiary aliphatic radical, and $n$ is a number from 0 to 30. The group $C_nH_{2n}$ is a primary or secondary alkyl group. Included within the scope of the above formula are compounds in which one or more of the hydrogen atoms of the aromatic nucleus, of the radical R, and of the $C_nH_{2n}$ group may be replaced by substituent atoms or groups consisting of or containing carbon, hydrogen, oxygen, nitrogen, phosphorus, sulfur, or halogens, such as alkyl, aralkyl, cycloalkyl, —OH, —SH, —NH$_2$, —NH(alkyl), —N(alkyl)$_2$, halogen, —O(alkyl), —O(aryl), —S(alkyl), —S(aryl), —CO(alkyl), —CO(aryl), —CHO, —COOH, —COO(alkyl), as well as groups containing metals, such as —OM, —SM, —COOM, —CSSM, etc., or, in the place of the metals, basic groups, such as the ammonium, sulfonium, phosphonium and pyridonium base radicals.

The above described class of aldehyde compounds may be conveniently prepared by mildly oxidizing the corresponding compounds of the formula $$ROArC_nH_{2n}CH_3 \qquad (2)$$

where R, Ar and $n$ have the same meanings as in Formula 1. The oxidation may be carried out by any suitable process, such as air oxidation or treatment with dichromate or permanganate solutions. The number of carbon atoms remaining in the $C_nH_{2n}$ group after oxidation is determined by the oxidizing conditions employed as well as the number of carbon atoms originally present.

A more preferred group of compounds, whose oxidation products may be used in accordance with the present invention, are those falling within the scope of Formula 1 and having a benzene ring as the aromatic nucleus, and having an alkyl group as a side chain. Such a class of compounds may be defined by the formula

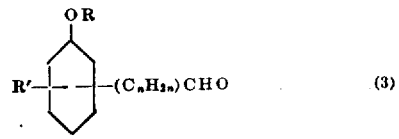

(3)

in which R and $n$ have the same meaning as in Formula 1, and R' is an alkyl group.

The most readily prepared compounds of the class defined by Formula 2, which may be oxidized to give the antioxidant materials of the present invention, are the tertiary butyl ethers of ortho para dialkyl phenols, in which the alkyl group attached to the benzene ring in the para position is a straight chain or primary group and the alkyl group in the ortho position is a secondary or tertiary group. A readily available raw material for the preparation of such a compound is p-cresol, which may be reacted with isobutene in the presence of sulfuric acid to form the tertiary butyl ether of o-tertiary butyl p-cresol, having the formula

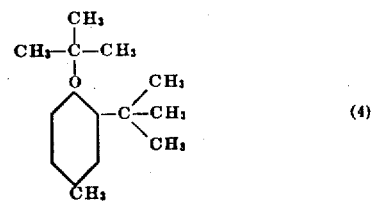

(4)

When this material is oxidized by an acidic dichromate solution or by other suitable mild oxidation means, the product formed is an ether of an aromatic aldehyde, whose constitution is believed to be represented by the formula

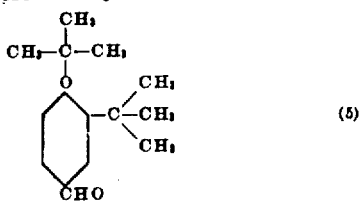

Among other compounds suitable for oxidation to the aldehydic compounds which are useful in accordance with this invention the following may be listed:

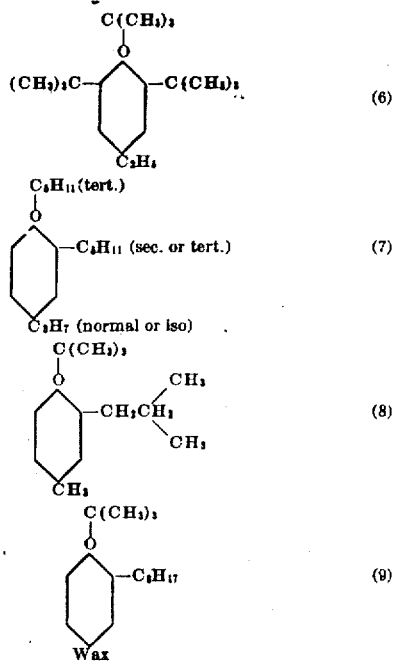

In Formula 9 the radical "wax" refers to a long chain paraffin residue having at least 12 carbon atoms, and additional aliphatic-aromatic ether groups of the present invention may be attached to such wax radical.

When long chain alkyl groups are introduced into the compounds, as by alkylation with halogenated paraffin wax, mono-halogenated wax tends to give alkylated phenol ethers of the following types:

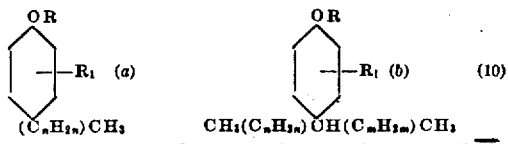

However, if polyhalogenated wax is used it is possible for two or more phenolic groups to be attached to the same alkyl chain, as follows:

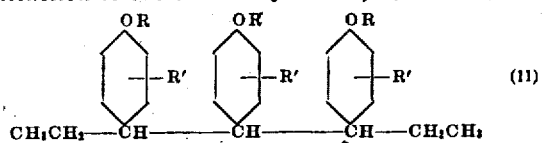

In the oxidation of these compounds to aldehydes the terminal carbon atoms of the alkyl chains may be oxidized to the CHO group, or, depending on conditions, part or all of the alkyl chain may be "burned off" so that the CHO group may be directly attached to the aryl nucleus or it may be separated from it by relatively few alkyl carbon atoms. Since the exact size of the alkyl chain remaining with an aldehyde group cannot always be predicted or ascertained in practicing this invention, many of the products are more accurately described as aldehydic oxidation products of the original ether compounds rather than as aldehydes of a definite chemical structure.

As previously stated, the new antioxidants may advantageously be used to retard the oxidation of any organic material susceptible to normal deterioration or alteration in the presence of oxygen. They are of particular value in inhibiting the oxidation of mineral lubricating oils under conditions of service in which there are normally formed considerable quantities of oxidation products which are corrosive to metal surfaces. The new antioxidants will greatly retard the formation of such corrosive substances. For this purpose it is generally preferred to add 0.01 to 5%, usually 0.1 to 1.0%, of the materials to an oil. The exact amount to be used for optimum results will depend partly upon the particular type of composition being used as well as upon other factors, such as the severity of the operating conditions to which the lubricating oil will be exposed and the nature of the mineral oil base stock itself. The additives can be used in distillates and in oils containing residual stocks. The oils may be extracted, filtered, hydrogenated, acid treated or otherwise refined, and of high or low viscosity index, and they may be natural or synthetic oils. The finished lubricating oil compositions may also contain other addition agents such as are found in lubricating compositions, for example, oiliness agents, thickeners, viscosity index improvers, pour depressants, detergents, sludge dispersers, solvents, other antioxidants, dyes, metal passifiers, etc. The new antioxidants may also be used to advantage in compounded oils and in greases.

The new antioxidants may likewise be employed in gasolines and other motor fuels to decrease the amount of gum formed on standing for long periods. The quantities of antioxidant preferred for this use are in general from 0.001 to about 0.5%.

The antioxidants are of value when added to "white products" obtained from petroleum, such as kerosenes, white oils, and waxes. The amounts to be added are in general of a range similar to that preferred for gasolines.

Many further uses of the new class of antioxidant materials can be mentioned; for example, they may be used in drying oils and in paints and other coating compositions containing such oils to retard skinning; and they may be added to fatty oils of animal or vegetable origin to prevent the development of rancidity; and generally they may be used with any organic materials subject to deterioration by atmospheric oxygen.

Methods of preparing the tertiary alkyl ethers of alkylated aromatic compounds and methods of oxidizing the same to form the desired aldehydic oxidation products of the present invention, as well as actual oxidation tests of materials containing these compounds as ingredients, are described in the examples which follow, which are given by way of illustration only and do not limit the scope of the invention in any way.

EXAMPLE 1

PREPARATION OF THE TERTIARY BUTYL ETHER OF o-TERTIARY BUTYL p-CRESOL 324 parts by weight of technical p-cresol and 16 parts by weight of 95.5% to 96% commercial sulfuric acid are agitated at 70° C. in a suitable reaction vessel while isobutene is bubbled through the mixture. After about four hours the reaction is substantially complete, as indicated by the flow of isobutene from the gas exit of the reaction vessel. The reaction mixture is then blown with steam and washed with hot water and then with dilute alkali until neutral. The crude product (89% yield) is an oily material which readily crystallizes when cooled. When the product is recrystallized from hot alcohol, the tertiary butyl ether of o-tertiary butyl p-cresol is obtained in the form of white crystals melting at 69.2° to 69.4° C.

EXAMPLE 2

OXIDATION OF THE TERTIARY BUTYL ETHER OF O-TERTIARY BUTYL P-CRESOL

To a solution of 100 parts by weight of potassium dichromate in 300 parts by weight of water is added 150 parts by weight of 96% sulfuric acid and the mixture heated to a temperature of 70° C. Then there is added slowly, with agitation, 50 parts by weight of the tertiary butyl ether of o-tertiary butyl p-cresol, prepared, for example, by the method described in Example 1. During this addition, which should require about 45 minutes, the temperature may rise to about 80° C., and further temperature rise should be prevented by external cooling means. The reaction product is extracted with aqueous potassium hydroxide and the extract neutralized with hydrochloric acid. The neutralized extract is purified by dissolving in light naphtha and washing with water. The product, recrystallized from alcohol, is a white crystalline powder having a melting point of 185° C.

EXAMPLE 3

OXIDATION OF THE TERTIARY BUTYL ETHER OF O-TERTIARY BUTYL P-ETHYL PHENOL

The oxidation of tertiary butyl ether of o-tertiary butyl p-ethyl phenol may be accomplished by a procedure similar to that described in Example 2, using 20 parts by weight of the ether in a solution of 40 parts by weight of potassium dichromate, and 60 parts by weight of 96% sulfuric acid in 80 parts by weight of water. The product when extracted with aqueous potassium hydroxide solution and the alkali-soluble portion crystallized from ethyl ether gives a product having a melting point of 149.4° C.

EXAMPLE 4

STAEGAR OXIDATION TEST OF LUBRICATING OIL PRODUCTS

The ability of lubricating oils, containing small amounts of the antioxidants of the present invention, to resist deterioration at high temperatures was determined by a test known as the Staeger oxidation test. This test was conducted as follows:

200 cc. of the oil were poured into a glass beaker of 400 cc. capacity. To accelerate aging, a cleaned and polished copper strip 40 x 70 mm. and 1 mm. thick was put into the beaker as a catalyst. The beaker containing the oil and catalyst was placed on a rotating shelf in an oven, the oven temperature being maintained at 110° C. and the shelf rotated at 5 to 6 R. P. M. Purified air was blown through the oven at the rate of 1.5 to 2 cu. ft. per hour. The life of the oil was determined by observing the time required for the oil to show deterioration as evidenced by a neutralization number of 0.2.

Oils having a base consisting of an extracted Mid-Continent oil of 43 seconds Saybolt viscosity at 210° F. and containing 0.1% of the aldehyde of tertiary butyl ether of o-tertiary butyl p-cresol and 0.1% of the aldehydic oxidation product of tertiary butyl ether of o-tertiary butyl p-ethyl phenol, respectively, as well as a sample of unblended oil base, were tested by the method described above, the results being as shown in Table I.

Table I

| Oil | Staeger life |
|---|---|
| | Hours |
| Unblended oil | 85–90 |
| Base oil +0.1% aldehyde of tert. butyl ether of o-tert. butyl p-cresol | 575+ |
| Base oil +0.1% aldehydic oxidation product of tert. butyl ether of o-tert. butyl p-ethyl phenol | 350+ |

EXAMPLE 5

Samples of oil blends containing an antioxidant of the present invention, as well as another antioxidant for comparison, were submitted to a bearing corrosion test in which the extent of weight loss in bearings, due to corrosion by the oils, was determined. This test was conducted as follows:

500 cc. of the oil were placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter automotive bearings of copper-lead alloy of known weight were attached alternately on opposite sides of a stainless steel rod which was then immersed in the test oil and rotated at 600 R. P. M., thus providing sufficient agitation of the sample during the test. Air was then blown through the oil at the rate of 2 cu. ft. per hour for four hours, after which fresh quarter bearings were supplied to conduct the test for another four hours. After the bearings were removed and washed with naphtha, they were weighed to determine the amount of bearing weight lost by corrosion.

Samples of a refined lubricating oil of S. A. E. 20 grade containing, respectively, 0.25% of aldehyde of tertiary butyl ether of o-tertiary butyl p-cresol and 0.25% of di(tertiary amyl phenol) sulfide, which has been in commercial use in motor oils for some time as a corrosion inhibitor, as well as a sample of the unblended oil base, were tested in the manner described above. The results are shown in Table II, cumulative bearing weight losses being given, that is, the total weight lost by all four quarter bearings during the eight hours.

Table II

| Oil | Cumulative bearing weight loss in 8 hrs. |
|---|---|
| | Mg. |
| Unblended oil | 147 |
| Oil base +0.25% aldehyde of tert. butyl ether of o-tert. butyl p-cresol | 23 |
| Oil base +0.25% di(tert. amyl phenol) sulfide | 44 |

It is readily seen that the aldehyde is a very effective inhibitor of bearing corrosion, allowing only half as much weight loss as a commercially available additive generally rated as a very good corrosion preventive.

EXAMPLE 6

GASOLINE GUM STABILITY TESTS

Samples of unblended high olefinic polymer gasoline and of the same containing the aldehyde of tertiary butyl ether of o-tertiary butyl p-cresol in a concentration of one pound of aldehyde per 1,000 gallons of gasoline were tested for gum stability by the standard procedure known as the A. S. T. M. Standard Test D 525-39T (Committee D-2). The results of these tests are shown in Table III.

*Table III*

| Sample | Breakdown induction period |
|---|---|
|  | *Minutes* |
| Unblended gasoline | 495 |
| Gasoline + aldehyde of tert. butyl ether of o-tert. butyl p-cresol | 730 |

This invention is not to be considered as limited by any of the examples mentioned or described herein, which are given for illustrative purposes only, but are to be limited solely by the terms of the appended claims.

We claim:

1. The method of retarding the oxidation of an organic material subject to deterioration by atmospheric oxygen which comprises incorporating in said material a small amount of the aldehydic oxidation product of the tertiary butyl ether of o-tertiary butyl p-cresol.

2. An organic material subject to deterioration by atmospheric oxygen having incorporated therein a small amount of an aromatic aldehyde having the formula

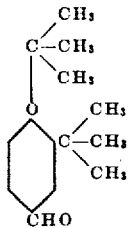

3. An organic material subject to deterioration by atmospheric oxygen having incorporated therein a small amount of the aldehydic oxidation product of the tertiary butyl ether of o-tertiary butyl p-cresol.

4. A mineral lubricating oil containing a small amount of the aldehydic oxidation product of the tertiary butyl ether of o-tertiary butyl p-cresol.

5. A gasoline containing a small amount of the aldehydic oxidation product of the tertiary butyl ether of o-tertiary butyl p-cresol.

6. A hydrocarbon material subject to deterioration by atmospheric oxygen having incorporated therein a small amount of an aromatic aldehyde having the formula

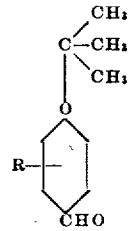

where R is an alkyl radical.

7. A mineral lubricating oil containing a small amount of an aromatic aldehyde having the formula

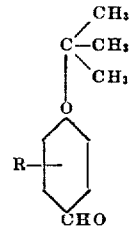

where R is an alkyl radical.

8. A gasoline containing a small amount of an aromatic aldehyde having the formula

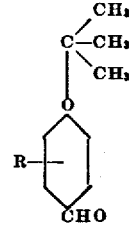

where R is an alkyl radical.

WARREN M. SMITH.
CARROLL J. WILSON.